(12) United States Patent  (10) Patent No.: US 9,348,732 B2
Van Vechten et al.  (45) Date of Patent: May 24, 2016

(54) MICROSTACKSHOTS

(71) Applicant: Apple Inc., Cupertino, CA (US)

(72) Inventors: Kevin James Van Vechten, San Francisco, CA (US); Shantonu Sen, Cupertino, CA (US); Craig M. Federighi, Los Altos, CA (US); Guy L. Tribble, Hillsborough, CA (US)

(73) Assignee: Apple Inc., Cupertino, CA (US)

( * ) Notice: Subject to any disclaimer, the term of this patent is extended or adjusted under 35 U.S.C. 154(b) by 560 days.

(21) Appl. No.: 13/842,938

(22) Filed: Mar. 15, 2013

(65) Prior Publication Data

US 2014/0237219 A1 Aug. 21, 2014

Related U.S. Application Data (60) Provisional application No. 61/765,625, filed on Feb. 15, 2013.

(51) Int. Cl.
*G06F 7/38* (2006.01)
*G06F 9/00* (2006.01)
*G06F 9/44* (2006.01)
*G06F 11/36* (2006.01)
*G06F 11/07* (2006.01)

(52) U.S. Cl.
CPC .......... *G06F 11/366* (2013.01); *G06F 11/0706* (2013.01); *G06F 11/079* (2013.01)

(58) Field of Classification Search
CPC .................................................. G06F 9/30145
USPC .......................................................... 712/227
See application file for complete search history.

(56) References Cited

U.S. PATENT DOCUMENTS

| 7,058,928 B2 | 6/2006 | Wygodny et al. |
| 8,140,911 B2 | 3/2012 | Borghetti et al. |
| 2011/0067008 A1 | 3/2011 | Srivastava et al. |

*Primary Examiner* — Chun-Kuan Lee
(74) *Attorney, Agent, or Firm* — Blakely, Sokoloff, Taylor & Zafman (57) ABSTRACT

A method and apparatus of a device that captures a stackshot of an executing process is described. In an exemplary embodiment, the device detects an interrupt of the process occurring during the execution of the process, where the process execution can be in a kernel space and user space, and the interrupt occurs during the user space. The device further determines whether to capture a stackshot during the interrupt using a penalty function. If the stackshot is to be captured, the device captures the stackshot and saves the stackshot.

20 Claims, 11 Drawing Sheets

MICROSTACKSHOTS

RELATED APPLICATIONS

Applicant claims the benefit of priority of prior, co-pending provisional application Ser. No. 61/765,625, filed Feb. 15, 2013, the entirety of which is incorporated by reference.

FIELD OF INVENTION

This invention relates generally to process management and more particularly to determining a time during process execution to record an execution profile.

BACKGROUND OF THE INVENTION

A process executing in a device will invoke one or more functions to perform the actions of the executing process. At any point in the execution of the process, there is a stack of active frames that represent the call stack of these invoked functions. A backtrace is a report of the active stack frames of a process at a certain point in time during the execution of that process. In one embodiment, the backtrace is commonly used during interactive and post-mortem debugging. The backtrace allows a system analyzer to track a sequence of nested functions called up to the point where the backtrace is generated. In a post-mortem scenario, this is up to function where the failure occurred (but not necessarily caused there). A backtrace can also be gathered with a specified frequency to generate an execution profile of what functions are being used by the process.

A problem with a generating a backtrace at a fixed frequency, or also known as acquiring a stackshot, is that acquiring this stackshot can require a system interrupt, which can degrade the performance of the device that is acquiring the stackshot. In other words, in order to get an idea of how the process is executing, the stackshot acquisition can interfere with the running of the device. Thus, stackshot acquisition tends to be limited to debugging the device or a post-mortem analysis.

SUMMARY OF THE DESCRIPTION

A method and apparatus of a device that captures a stackshot of an executing process is described. In an exemplary embodiment, the device detects an interrupt of the process occurring during the execution of the process, where the process execution can be in a kernel space and user space, and the interrupt occurs during the user space. The device further determines whether to capture a stackshot during the interrupt using a penalty function. If the stackshot is to be captured, the device captures the stackshot and saves the stackshot.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

A method and apparatus of a device that captures a stackshot of an executing process is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that captures a stackshot of an executing process is described. A stackshot is a representation of the active stack frames (or backtrace) of an executing process along with other information characterizing the executing process. In one embodiment, the device detects a system interrupt that occurs during the execution of the process. In addition, the device determines if the system interrupt occurs during user space execution of the process. The user space execution is execution of user functions of the process. If the system interrupt occurred during the user space execution, the device applies a penalty function to determine if the stackshot is to be acquired. For example and in one embodiment, the device applies a step function that will acquire the stackshot occurring in a time period and does not acquire the stackshot for subsequent system interrupts in that time period. In another embodiment, the device applies a probabilistic function for each occurring system interrupt in that time period, so that each occurring system interrupt has a finite possibility to trigger a stackshot. Other types of penalty functions are possible as described below. If the stackshot is to be acquired, the device stores a representation of the stack frames of the executing process subsequent to the device switching to the interrupt handler to handle the system interrupt. In addition to the active stack frame representation, the device acquires the process priority, process importance, package idle wakeups, as well as information describing the layout of dynamic shared libraries in the process' address space. By executing a stackshot acquisition at the invocation of a system interrupt instead of scheduling its own timer interrupt, the device can reduce the cost of the stackshot acquisition and can record the stack frames of the process execution. In addition, by using this low-cost microstackshot acquisition across multiple devices, aggregate information can be provided about the real-world use of the device, the device operating system, and applications executed by the device.

Figure 1:
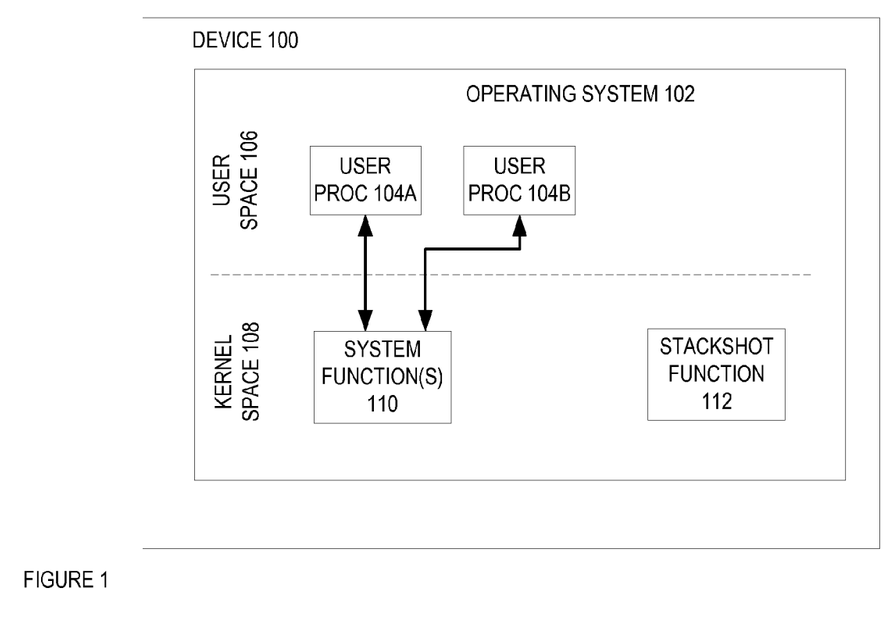
FIG. 1 is a block diagram of one embodiment of a device with a user application process communicating with system process(es).

FIG. 1 is a block diagram of one embodiment of a device with user application process 104A-B communicating with system function(s) 110. In one embodiment, the device 100 can be a personal computer, laptop, server, mobile device (e.g., smartphone, laptop, personal digital assistant, music playing device, gaming device, etc.), network element (e.g., router, switch, gateway, etc.), and/or any device capable of executing a multi-function process. In one embodiment, the device can be a physical or virtual device. In FIG. 1, the device 100 includes an operating system 102 that is a set of software used to manage computer hardware resources and provides common services for other running computer programs, such as application programs. In one embodiment, the operating system 102 manages different running processes by time scheduling when a processor of the device 100 executes each running process. In one embodiment, a process is an instance of a computer program that is being executed. In this embodiment, the process may be a user application that is executing as a result of user input Examples of user processes are web surfing, word processing, email, social media, media processing, etc. Another example of a process is a system process that provides one or more services to a user application, other process, etc.

In one embodiment, an execution of a process can be in either user space or kernel space. In one embodiment, a conventional computer operating system can segregate virtual memory into kernel space and user space. In this embodiment, the kernel space is reserved for running the kernel, kernel extensions, and most device drivers. In contrast, user space is the memory area where user mode applications work and this memory can be swapped out when necessary. In this embodiment, a process execution timeline can include execution of the process user space functions and execution of system or kernel functions in kernel space.

In one embodiment, a function in kernel space called a stackshot function 114 that can acquire a stackshot for a process 104A-B or system functions 106. In one embodiment, a stackshot of a process includes a backtrace and other information described below. In one embodiment, a backtrace is a report of the active stack frames of a process at a certain point in time during the execution of that process. In one embodiment, the backtrace is commonly used during interactive and post-mortem debugging. The backtrace allows a system analyzer to track the sequence of nested functions called up to the point where the stack trace is generated. In a post-mortem scenario, this is up to function where the failure occurred (but not necessarily is caused there). In addition, the stackshot function can acquire other information regarding the process described below (e.g., process priority, process importance, etc.).

In one embodiment, a stackshot can also be used to determine how the device is being used at a certain point in an execution history of that device. In this embodiment, the stackshot is not just used to debug a problem. Instead, multiple stackshots for that device can be used, in aggregate, to give an execution profile of the device. For example and in one embodiment, multiple stackshots acquired over a longer time frame can give an indication of which programs were actively running and how each of these programs were being used. In this embodiment, this aggregate information can suggest areas of optimization for power management, area of improvement for code efficiency, insight into which code is run after a package idle wakeup, etc. When used over multiple different devices, an aggregation of the stackshots from different devices can give a system analyzer an indication how these devices are being used.

A problem with acquiring periodic stackshots is that programming timer hardware to invoke a timer interrupt can degrade the performance of the device that is acquiring the stackshot. In other words, in order to get an idea of how the process is executing, the stackshot acquisition can interfere with the running of the device. Thus, stackshot acquisition tends to be limited to debugging the device or a post-mortem analysis.

Figure 2:
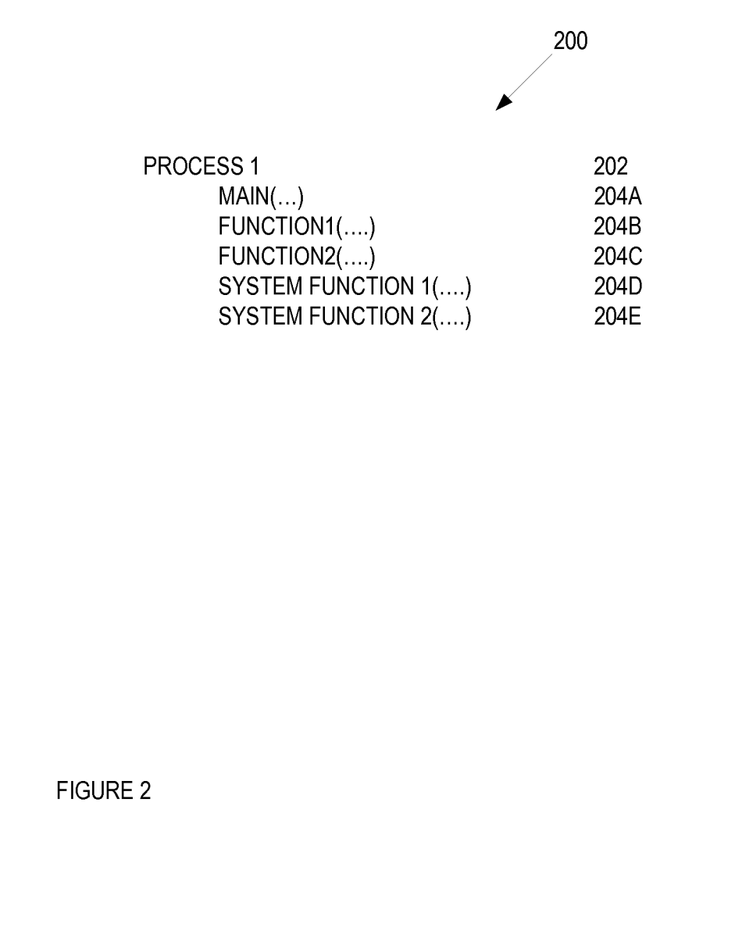
FIG. 2 is a block diagram of one embodiment of a backtrace of a process.

FIG. 2 is a block diagram of one embodiment of a backtrace 200 of a process 202. In FIG. 2, the backtrace 200 of the process 202 includes a call stack of a main function 204A, process functions 204B-C, and system functions 204D-E. In one embodiment, the main function 202 is the top-level function of the process 202 and is the function that is initially invoked to the start the process 202. In one embodiment, the main function 204A calls function1 204A, which in turn calls function2 204B. Function2 204C in turn calls system function1 204D. In one embodiment, the system function1 204D could be a system library call (e.g., reading/writing data to a file, perform network operations, requesting system information, etc.). In addition, system function1 204D calls another system function, system function2 204E. In one embodiment, system function2 is a system call that invokes a system interrupt. In one embodiment, a system interrupt is a signal to the processor emitted by the called function indicating an event that needs immediate attention. This system interrupt alerts the processor to a high-priority condition requiring the interruption of the current code the processor is executing, the current thread. The processor responds by suspending the current process, saving the state of the process, and executing a small program called an interrupt handler (or interrupt service routine, ISR) to deal with the event. This interruption is temporary, and after the interrupt handler finishes, the processor resumes execution of the previous process. During a typical system interrupt, once the process state is saved, the backtrace of the executing process is not available because the register state and address space of the previously running thread has been swapped with the register state and address space of the interrupt handler. When the executing process 202 is executing one of the functions in user space prior to an interrupt, the process 202 determines if a stackshot should be acquired, and if so, acquires it.

Figure 3:
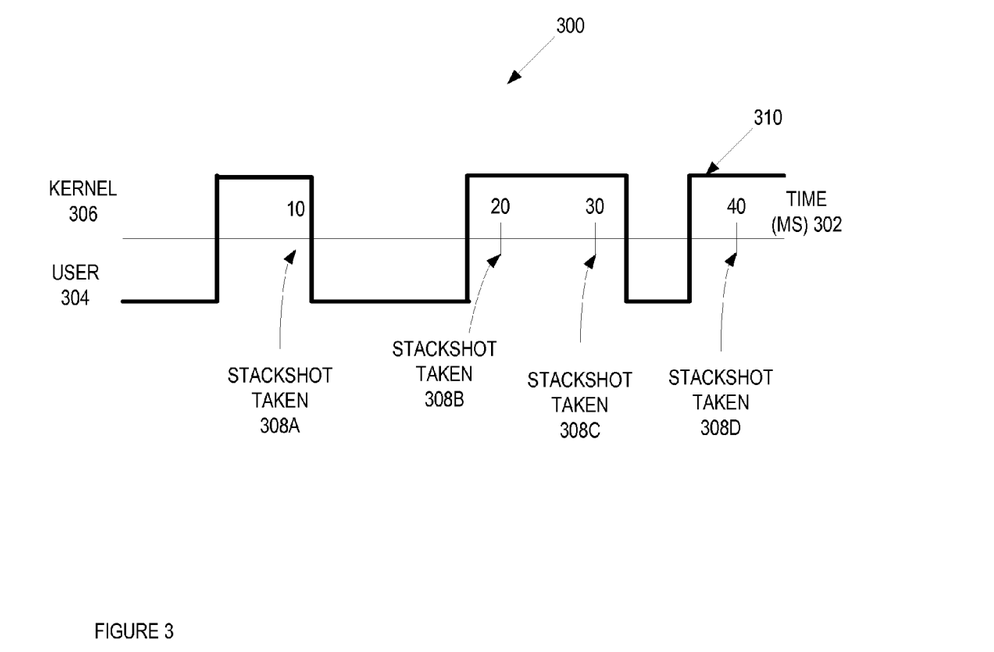
FIG. 3 is an illustration of one embodiment of a periodic stackshots taken for a process, where the process executes part of the time in user space and part of the time in kernel space.

As described above, an executing process can either be executing in user space or kernel space. FIG. 3 is an illustration of one embodiment of a periodic stackshots 308A-D taken for a process, where the process executes part of the time in user space 304 and part of the time in kernel space 306. In FIG. 3, stackshots are taken at periodic intervals, e.g., every 10 ms for stackshots 308A-D. As illustrated in FIG. 3, these stackshots can occur during the kernel space execution time (e.g., stackshots 308A-C) or can occur during user space execution (e.g., stackshot 308D). As described above, there are problems for each of stackshot acquisitions using a fixed time period stackshot acquisition. If the stackshot is acquired during kernel space execution, the stackshot is not of the user process that is executing, but is of the kernel services on behalf of the process, which are not directly controllable by the application programmer. If the stackshot is taken during the user space execution, a system interrupt is used to interrupt the system to acquire the stackshot. In this embodiment, an explicit system interrupt can cause problems, because the system interrupt can interfere with the execution of the process.

Instead of using a fixed periodic timetable for acquiring stackshots, it would be more useful to acquire a stackshot at a time during the process execution lifetime where there is less impact of the process execution and still provide the backtrace of the process execution. In one embodiment, the stackshot acquisition decision can occur when a system interrupt is detected during the execution of the process. For example and in one embodiment, if the process execution includes an input/output request, a page swap, etc., a system interrupt is generated and the stackshot acquisition logic can detect this system interrupt to decide if a stackshot is to be acquired. By taking advantage of a system interrupt that would occur as part of the process's normal execution, a stackshot acquisition mechanism can lessen the impact of a stackshot acquisition. In addition, by doing the stackshot acquisition as a system interrupt occurs, the stackshot acquisition mechanism can acquire a stackshot before the process state is restored. In this embodiment, the stackshot acquisition process is a "microstackshot" stackshot acquisition has a smaller impact on the execution than a fixed time period based stackshot mechanism.

In addition to the backtrace information, the microstackshot acquisition acquires the process priority, process importance, and/or package idle wakeup. By executing a stackshot acquisition at the invocation of a system interrupt, the device can reduce the cost of the stackshot acquisition and can record the stack frames of the process execution. In addition, by using this low-cost stackshot acquisition across multiple devices, can provide aggregate information about the real-world use of the device, the device operating system, and applications executed by the device.

In one embodiment, the stackshot acquisition records the process priority and process importance. In this embodiment, some processes may have a higher or lower importance than other processes. In one embodiment, the process importance is a collection of properties associated with a task/process to indicate that actions are needed on behalf of the user who is currently interacting with the device. It indicates that the user is waiting for these actions to be completed and this task/process is to be treated with urgency. A process importance can include central processing unit schedule priority for the process, input/output scheduling, network bandwidth priorities, memory management, graphics resource usage, etc., and/or a combination thereof. A process priority is a property that indicates the urgency with which that task or thread is picked to run (or execute) when there are many tasks that need to be run. This process priority is used by the operating system to schedule when a process is to be executed. In one embodiment, a process with a higher importance than other processes would consume a greater amount of the mobile device resources (e.g., processor resources, etc.). In this embodiment, a process with a higher importance would appear to run faster than a process of lower importance. In one embodiment, the importance may be assigned based on a range of numbers from a lowest importance to a highest importance. For example and in one embodiment, an importance range could range from one to ten, 0-127, low/high, or another range of values.

In one embodiment, a process can include one or more threads, where a thread is the smallest unit processing that can be scheduled by the operating system. Multiple threads can exist within the same process and share resources the process resources (e.g., memory, instructions, context, etc.). In one embodiment, the stackshot acquisition acquires stackshots for individual threads, and not the process as a whole. Multiple stackshots over time may indicate execution amongst multiple threads.

Figure 4:
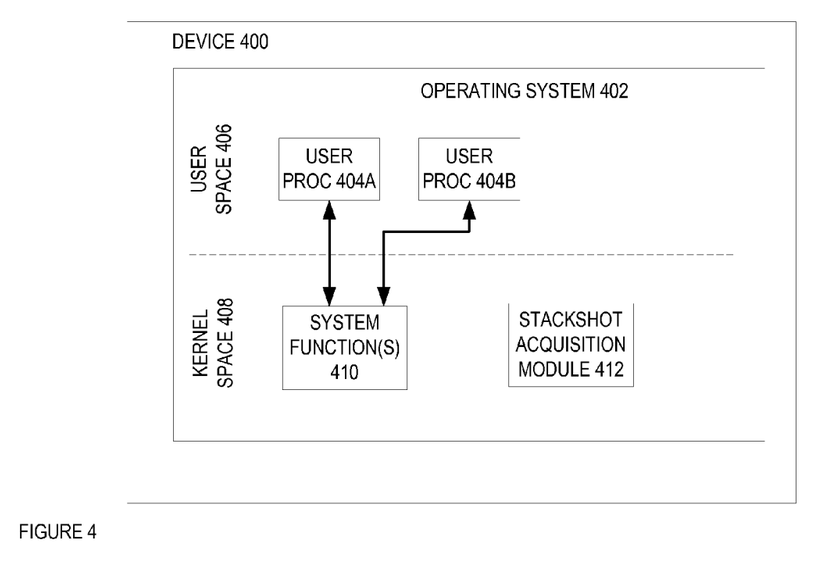
FIG. 4 a block diagram of one embodiment of a device with a user application process communicating with system process(es) and the device includes a stackshot acquire module to determine when to acquire a stackshot.

FIG. 4 is a block diagram of one embodiment of a device 400 with user processes 404A-B communicating with system functions and the device includes a stackshot acquire module to determine when to acquire a stackshot. In FIG. 4, the device 400 includes an operating system 102 that is a set of software used to manage computer hardware resources and provides common services for other running computer programs, such as application programs. In one embodiment, the operating system 102 manages different running processes by time scheduling when a processor of the device 100 executes each running process.

In one embodiment, a function in kernel space called a stackshot acquisition function 412 can capture a stackshot for a process 104A-B. In addition, the stackshot function 412 determines when to acquire the stackshot of one or more of the user processes 404A-B. In one embodiment, the stackshot acquisition module 412 determines if a system interrupt has occurred and if the system interrupt has occurred, determines if this system interrupt is one that should be used to acquire the stackshot. For example and in one embodiment, the stackshot acquisition module 414 acquires a stackshot for the first system interrupt in a certain time period, but does not acquire a stackshot after further system interrupts in the same time period. In this embodiment, the stackshot acquisition module 412 applies a step function penalty to determine when to use a system interrupt in a time period. If the stackshot acquisition module 412 determines that the stackshot should be acquired, the stackshot acquisition function 412 acquires the stackshot. In one embodiment, the stackshot function 410 reads the user process 404A-B call stack and saves this call stack as report. In one embodiment, the call stack is a backtrace as described above in FIG. 2.

Figure 5:
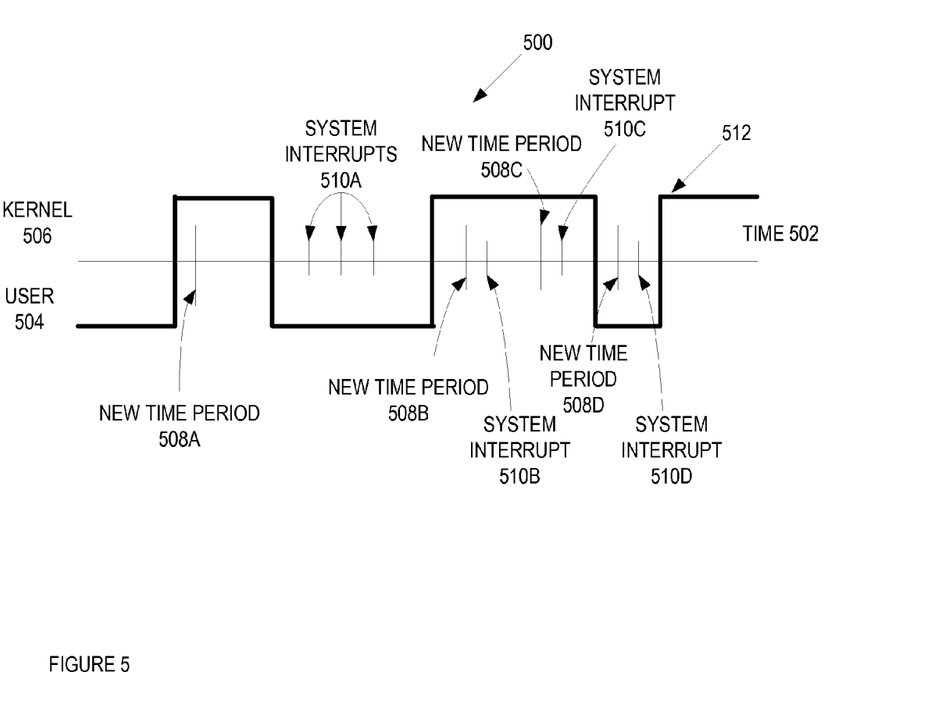
FIG. 5 is an illustration of one embodiment of microstackshots taken for a process, where the process executes part of the time in user space and part of the time in kernel space.

FIG. 5 is an illustration of one embodiment of microstackshots taken for a process execution timeline 512, where the process executes part of the time in user space 504 and part of the time in kernel space 506. In this embodiment, in the new time period 508A-D, the stackshot acquisition module 412 determines if a stackshot is to be acquired as a result of a system interrupt. In one embodiment, a new time period 508A-D is determined based on a fixed time interval, a dynamic time period, or some other event such as a central processing unit (CPU) package idle transition. The new time period can start in user space or in kernel space. For example and in one embodiment, new time periods 508A and 508D start with the process execution occurring in the kernel space and new time periods 508B-C star in user space. In another embodiment, the new time periods can solely start in user space or kernel space. In one embodiment, there can be one or more time periods during a process execution timeline 512.

In one embodiment, once a new time period starts, the stackshot acquisition module 412 determines if a system interrupt triggers a stackshot acquisition. In one embodiment, a system interrupt during execution in kernel space would not trigger stackshot acquisition, whereas a system interrupt during user space execution may trigger a stackshot acquisition. In this embodiment, system interrupts 510B-C occurs during kernel space execution. These system interrupt would not trigger a stackshot acquisition because the information available for a backtrace is not interesting. On the other hand, system interrupts 510A and 510D may lead to interesting information about the executing process and, therefore, may lead to a stackshot acquisition. Whether a stackshot acquisition is performed depends on a penalty function that is applied to the system interrupt event. Whether to acquire the stackshot is further described in the FIG. 6 below.

Figure 6:
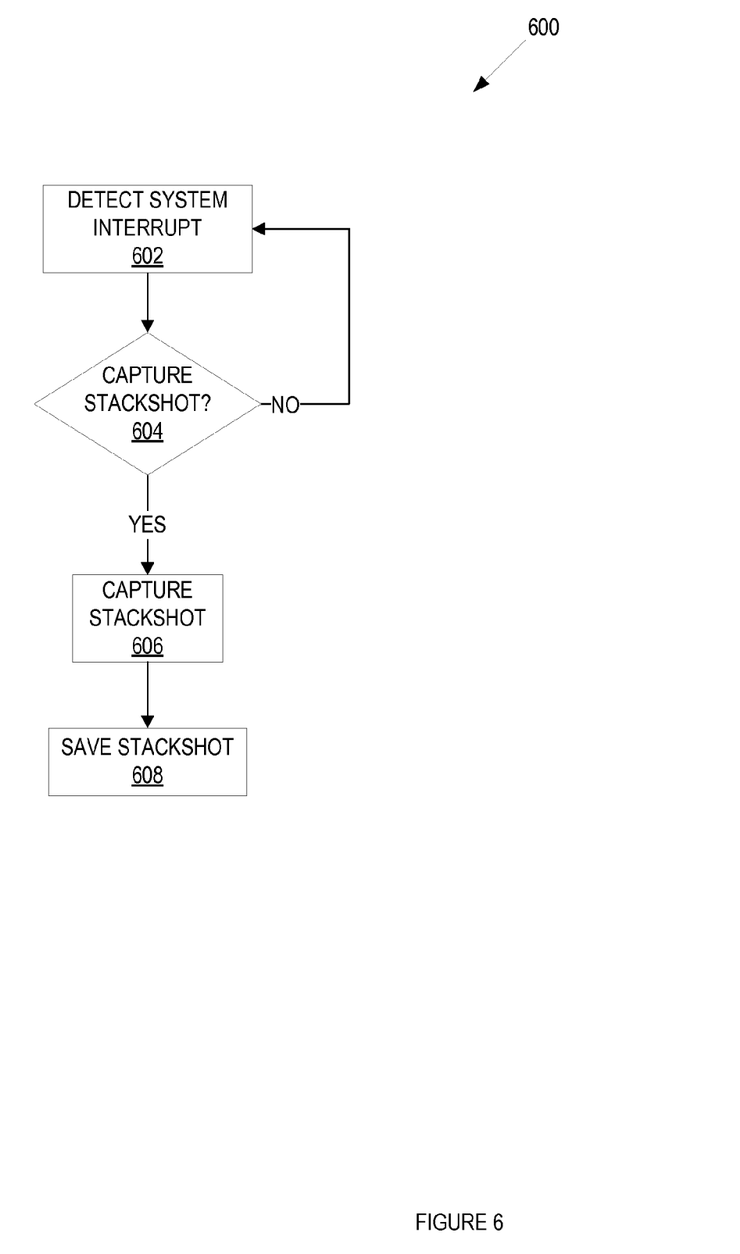
FIG. 6 is a flowchart of one embodiment of a process to determine whether to acquire a stackshot.

FIG. 6 is a flowchart of one embodiment of a process 600 to determine whether to acquire a stackshot. In one embodiment, the stackshot acquisition module 412 performs process 600 to determine whether to acquire the stackshot. In FIG. 6, process 600 begins by detecting a system interrupt at block 602. In one embodiment, process 600 detects the system interrupt since the operating system has registered an interrupt handler with the processor, which is invoked to process the interrupt. At block 602, process 600 determines if a stackshot is to be acquired. In one embodiment, process 600 acquires a stackshot if the system interrupt occurs during user space process execution and if a penalty applied to the system interrupt indicates that a stackshot is to be acquired. Stackshot acquisition determination is further described in FIG. 7 below. If the stackshot is not to be acquired, execution proceeds to block 602 above.

If the stackshot is to be acquired, at block 606, process 600 captures the stackshot. In one embodiment, process 600 captures the stackshot by reading the executing process active stack frames for a backtrace and saves these stack frames as report. In addition, process 600 acquires other information regarding the process execution (e.g., process priority, process importance, package idle wakeup, dynamic shared library list, etc.). In one embodiment, the stack frames are a backtrace as described above in FIG. 2. At block 608, process 600 saves the stackshot. In one embodiment, process 600 saves the stackshot to storage for later analysis.

As described above, process 600 applies a penalty function that is used to determine whether to acquire a stackshot based on the detected system interrupt. In one embodiment, the penalty function is a step function to acquire the first stackshot in a time period and ignore other system interrupts. In another embodiment, the penalty function is no penalty, where all system interrupts trigger a stackshot acquisition. In a further embodiment, the penalty function is a probabilistic function where there is a finite probability that one, some or all of the system interrupts in the time period can trigger a stackshot acquisition. In this embodiment, the probability that a system interrupt triggers a stackshot acquisition can be a fixed probability, a random probability, weighted probability, dynamic probability, etc. In another embodiment, the penalty function depends on the type of system interrupt. For example and in one embodiment, a device interrupt from a universal serial bus (USB) input device may correlate to periods if user interactivity where stackshots should be recorded, but disk controller device interrupts may correlate with batch processing where stackshots should not be recorded.

Figure 7:
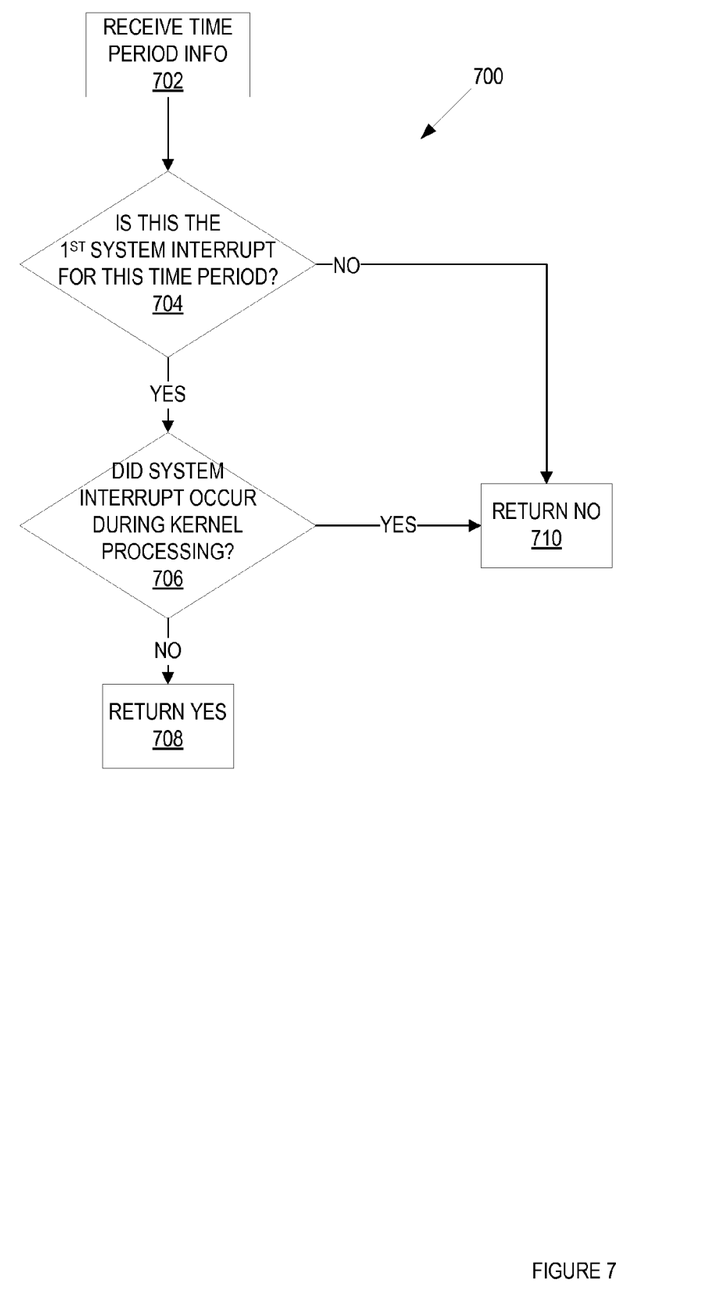
FIG. 7 is a flowchart of one embodiment of a process to determine whether to acquire a stackshot based on a system interrupt.

FIG. 7 is a flowchart of one embodiment of a process 700 to determine whether to acquire a stackshot based on a system interrupt. In one embodiment, process 700 applies a penalty step function to determine whether a detected system interrupt triggers a stackshot acquisition. In FIG. 7, process 700 begins by receiving the time period information and the information about the detected system interrupt. In one embodiment, the time period information includes when the time period started, and an indication of how many system interrupts have been detected in this time period. At block 704, process 700 determines if the detected system interrupt is the first system interrupt detected in this time period. If the system interrupt is not the first system interrupt, at block 710, process 700 returns a "no" to indicate that the system interrupt should not trigger a stackshot acquisition. If the system interrupt is the first system interrupt, at block 706, process 700 determines if the system interrupt occurs during execution in the kernel space. If the system interrupt occurred during kernel space execution, process 700 returns a "no" at block 710. If the system interrupt occurred during user space execution, process 700 returns a "yes" to indicate that the system interrupt should not trigger a stackshot acquisition at block 708.

Figure 8:
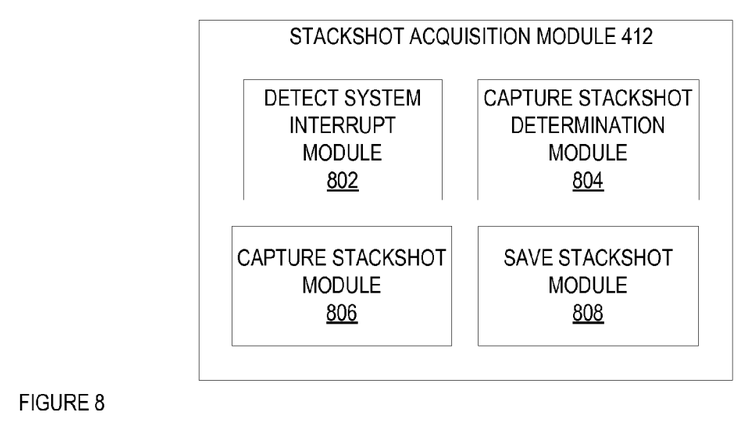
FIG. 8 is a block diagram of one embodiment of a stackshot acquire module to facilitate sending and receiving of message by processes.

FIG. 8 is a block diagram of one embodiment of a stackshot acquisition module 412 to facilitate sending and receiving of message by processes. In one embodiment, the stackshot acquisition module 412 includes detect system interrupt module 802, capture stackshot determination module 804, capture stackshot module 806, and save stackshot module 808. In one embodiment, the detect system interrupt module 802 detects a system interrupt as described in FIG. 6, block 602 above. The capture stackshot determination module 804 determines if the detected system interrupt will trigger a stackshot acquisition as described in FIG. 6, block 604 above. The capture stackshot module 806 captures the stackshot as described in FIG. 6, block 606 above. The save stackshot module 808 saves the stack shot as described in FIG. 6, block 608 above.

Figure 9:
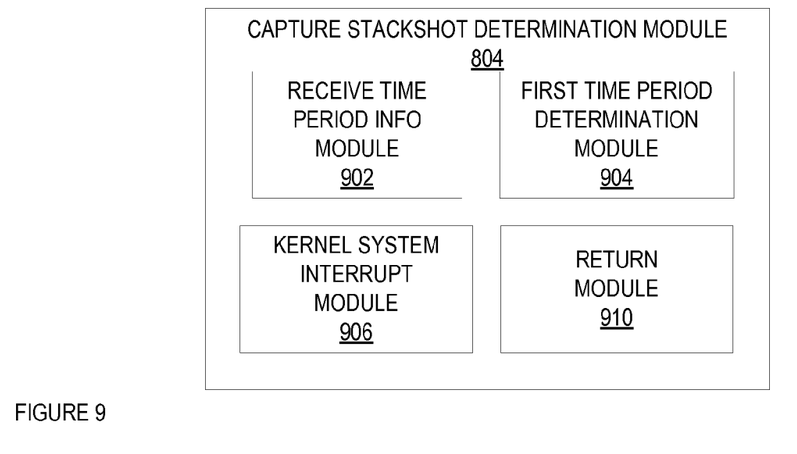
FIG. 9 is a block diagram of one embodiment of a capture stackshot determination module to determine whether to acquire a stackshot based on a system interrupt.

FIG. 9 is a block diagram of one embodiment of a capture stackshot determination module 804 to determine whether to acquire a stackshot based on a system interrupt. In one embodiment, the capture stackshot determination module 804 includes a receive time period information module 902, first time period determination module 904, kernel system interrupt module 906, and return module 908. In one embodiment, the receive time period information module 902 receive the time period and system interrupt information as described in FIG. 7, block 702 above. The first time period determination module 904 determine if the system interrupt is the first system interrupt in the time period as described in FIG. 7, block 704 above. The kernel system interrupt module 906 determines if the system interrupt occurs during kernel space execution as described in FIG. 7, block 706 above. The return module 908 returns an indication of whether the system interrupt should trigger a stackshot acquisition as described in FIG. 7, block 708 above.

Figure 10:
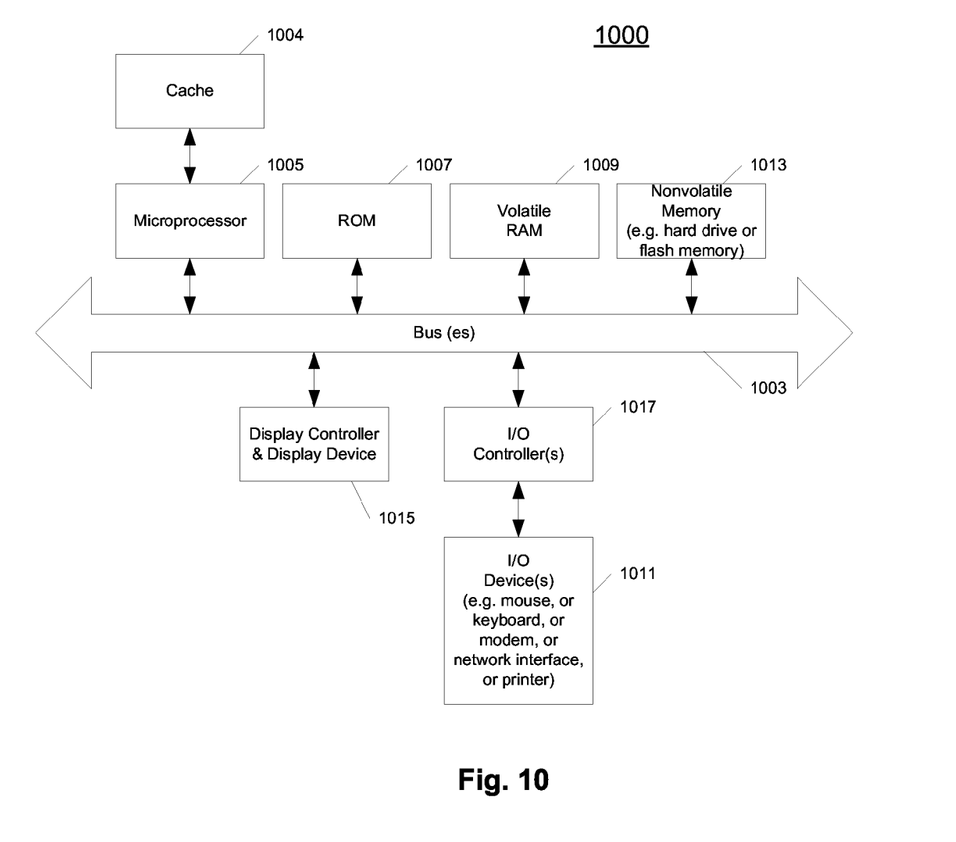
FIG. 10 illustrates one example of a typical computer system, which may be used in conjunction with the embodiments described herein.

FIG. 10 shows one example of a data processing system 1000, which may be used with one embodiment of the present invention. For example, the system 1000 may be implemented including a device 300 as shown in FIGS. 3A-B. Note that while FIG. 10 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 10, the computer system 1000, which is a form of a data processing system, includes a bus 1003 which is coupled to a microprocessor(s) 1005 and a ROM (Read Only Memory) 1007 and volatile RAM 1009 and a non-volatile memory 1011. The microprocessor 1005 may retrieve the instructions from the memories 1007, 1009, 1011 and execute the instructions to perform operations described above. The bus 1003 interconnects these various components together and also interconnects these components 1005, 1007, 1009, and 1011 to a display controller and display device 1013 and to peripheral devices such as input/output (I/O) devices which may be mice, keyboards, modems, network interfaces, printers and other devices which are well known in the art. Typically, the input/output devices 1015 are coupled to the system through input/output controllers 1013. The volatile RAM (Random Access Memory) 1009 is typically implemented as dynamic RAM (DRAM), which requires power continually in order to refresh or maintain the data in the memory.

The mass storage 1011 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1011 will also be a random access memory although this is not required. While FIG. 10 shows that the mass storage 1011 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1003 may include one or more buses connected to each other through various bridges, controllers and/or adapters as is well known in the art.

Figure 11:
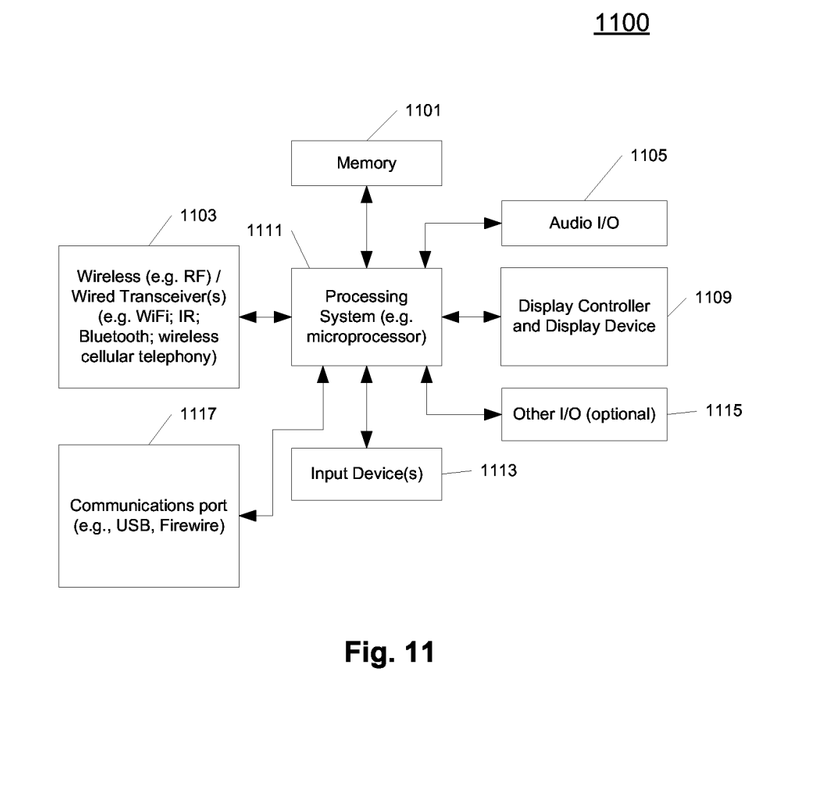
FIG. 11 shows an example of a data processing system, which may be used with one embodiment of the present invention.

FIG. 11 shows an example of another data processing system 1100 which may be used with one embodiment of the present invention. For example, system 1100 may be implemented as a device 400 as shown in FIG. 4. The data processing system 1100 shown in FIG. 11 includes a processing system 1111, which may be one or more microprocessors, or which may be a system on a chip integrated circuit, and the system also includes memory 1101 for storing data and programs for execution by the processing system. The system 1100 also includes an audio input/output subsystem 1105, which may include a microphone and a speaker for, for example, playing back music or providing telephone functionality through the speaker and microphone.

A display controller and display device 1109 provide a visual user interface for the user; this digital interface may include a graphical user interface which is similar to that shown on a Macintosh computer when running OS X operating system software, or Apple iPhone when running the iOS operating system, etc. The system 1100 also includes one or more wireless transceivers 1103 to communicate with another data processing system, such as the system 1100 of FIG. 11. A wireless transceiver may be a WLAN transceiver, an infrared transceiver, a Bluetooth transceiver, and/or a wireless cellular telephony transceiver. It will be appreciated that additional components, not shown, may also be part of the system 1100 in certain embodiments, and in certain embodiments fewer components than shown in FIG. 11 may also be used in a data processing system. The system 1100 further includes one or more communications ports 1117 to communicate with another data processing system, such as the system 1500 of FIG. 15. The communications port may be a USB port, Firewire port, Bluetooth interface, etc.

The data processing system 1100 also includes one or more input devices 1113, which are provided to allow a user to provide input to the system. These input devices may be a keypad or a keyboard or a touch panel or a multi touch panel. The data processing system 1100 also includes an optional input/output device 1115 which may be a connector for a dock. It will be appreciated that one or more buses, not shown, may be used to interconnect the various components as is well known in the art. The data processing system shown in FIG. 11 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1100 may be a network computer or an embedded processing device within another device, or other types of data processing systems, which have fewer components or perhaps more components than that shown in FIG. 11.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "capturing," "determining," "sending," "returning," "computing," "saving," "transferring," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to capture a stackshot of a process, the method comprising:
    detecting a system interrupt of the process occurring during runtime of the process, wherein the process runtime includes kernel runtime and user runtime, and the interrupt occurs during the user runtime;
    determining whether to capture the stackshot during the system interrupt using a penalty function; and
    if the stackshot is to be captured,
        capturing the stackshot, and
        saving the stackshot.

2. The non-transitory machine-readable medium of claim 1, wherein the penalty function is a time-based function.

3. The non-transitory machine-readable medium of claim 2, wherein the penalty function is selected from the group consisting of a time-based step function and a time weighted penalty function.

4. The non-transitory machine-readable medium of claim 1, wherein a time period is used in the penalty function and the time period is reset when the process runtime enters a new slice of user runtime.

5. The non-transitory machine-readable medium of claim 1, wherein the user runtime is a time period in which a user process is being executed.

6. The non-transitory machine-readable medium of claim 1, wherein the kernel runtime is a time period in which a kernel process is being executed.

7. The non-transitory machine-readable medium of claim 1, wherein the penalty function is based on a type of interrupts occurring in a slice of a user runtime.

8. The non-transitory machine-readable medium of claim 1, wherein the system interrupt is a signal of a high-priority condition that interrupts a current process that is executing.

9. The non-transitory machine-readable medium of claim 8, wherein an occurrence of the system interrupt is selected from the group consisting of a wake-up of a processor to execute code, a page fault, and an input/output operation.

10. The non-transitory machine-readable medium of claim 1, wherein the stackshot is a report of active stack frames at a point of time during an execution of a process.

11. A non-transitory machine-readable medium having executable instructions to cause one or more processing units to perform a method to determine an execution profile of a device, the method comprising:
  capturing a plurality of stackshots of a device for the execution profile of that device, wherein capturing one of the plurality of the stackshots includes,
    detecting a system interrupt of a process executing on the device, wherein the system interrupt occurs during the process execution, wherein the process execution includes execution in kernel space and user space, and the system interrupt occurs during the execution in the user space;
    determining whether to capture a stackshot during the system interrupt using a penalty function; and
    if the stackshot is to be captured,
      capturing the stackshot, and
      saving the stackshot, and
  determining the execution profile of the device using the plurality of stackshots.

12. The non-transitory machine-readable medium of claim 11, wherein the penalty function is a time-based function.

13. The non-transitory machine-readable medium of claim 12, wherein the penalty function is selected from the group consisting of a time-based step function and a time weighted penalty function.

14. A method to capture a stackshot of a process, the method comprising:
  detecting a system interrupt of the process occurring during execution of the process, wherein the process execution includes execution in kernel space and user space, and the system interrupt occurs during the execution in the user space;
  determining whether to capture the stackshot during the system interrupt using a penalty function; and
  if the stackshot is to be captured,
    capturing the stackshot, and
    saving the stackshot.

15. The method of claim 14, wherein execution in the kernel space is a time period in which a kernel process is being executed.

16. The method of claim 14, wherein the penalty function is based on the type of interrupts occurring in a slice of a user runtime.

17. The method of claim 14, wherein the system interrupt is a signal of a high-priority condition that interrupts a current process that is executing.

18. A device to capture a stackshot of a process executing on that device, the device comprising:
  a processor;
  a memory coupled to the processor though a bus; and
  a process executed from the memory by the processor to cause the processor to detect a system interrupt of the process occurring during execution of the process, wherein the process execution includes execution in kernel space and user space, and the system interrupt occurs during the execution in the user space, determine whether to capture the stackshot during the system interrupt using a penalty function, and if the stackshot is to be captured, capture the stackshot, and save the stackshot.

19. The device of claim 18, wherein the penalty function is a time-based function.

20. The device of claim 19, wherein the penalty function is selected from the group consisting of a time-based step function and a time weighted penalty function.

* * * * *